July 21, 1970 D. C. BRODERICK 3,521,197
HIGH FREQUENCY POWER LIMITER DEVICE FOR A WAVEGUIDE
Filed Oct. 24, 1967 4 Sheets-Sheet 2

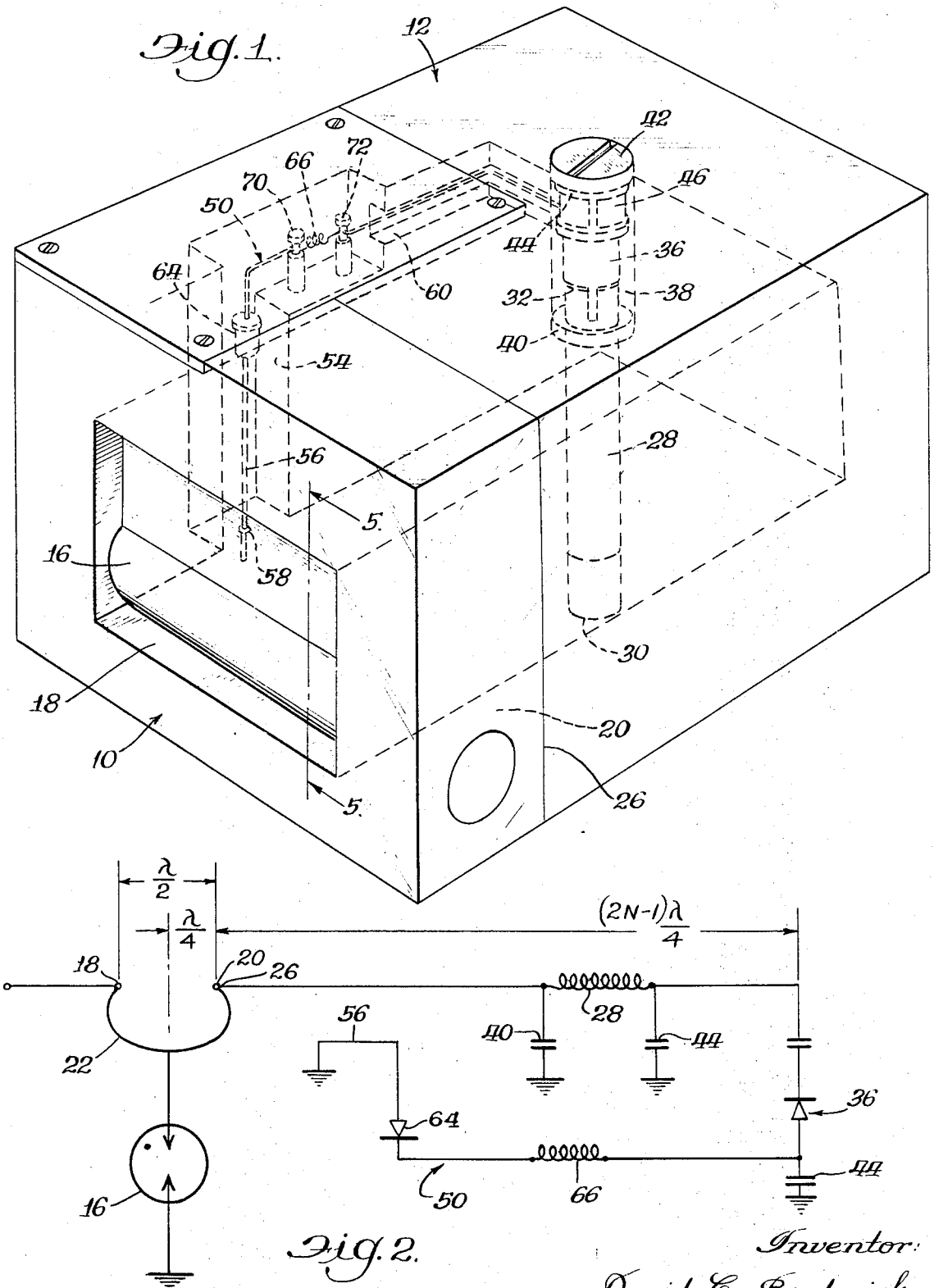

Inventor:
David C. Broderick
By Robert L. Slater, Jr.
Atty.

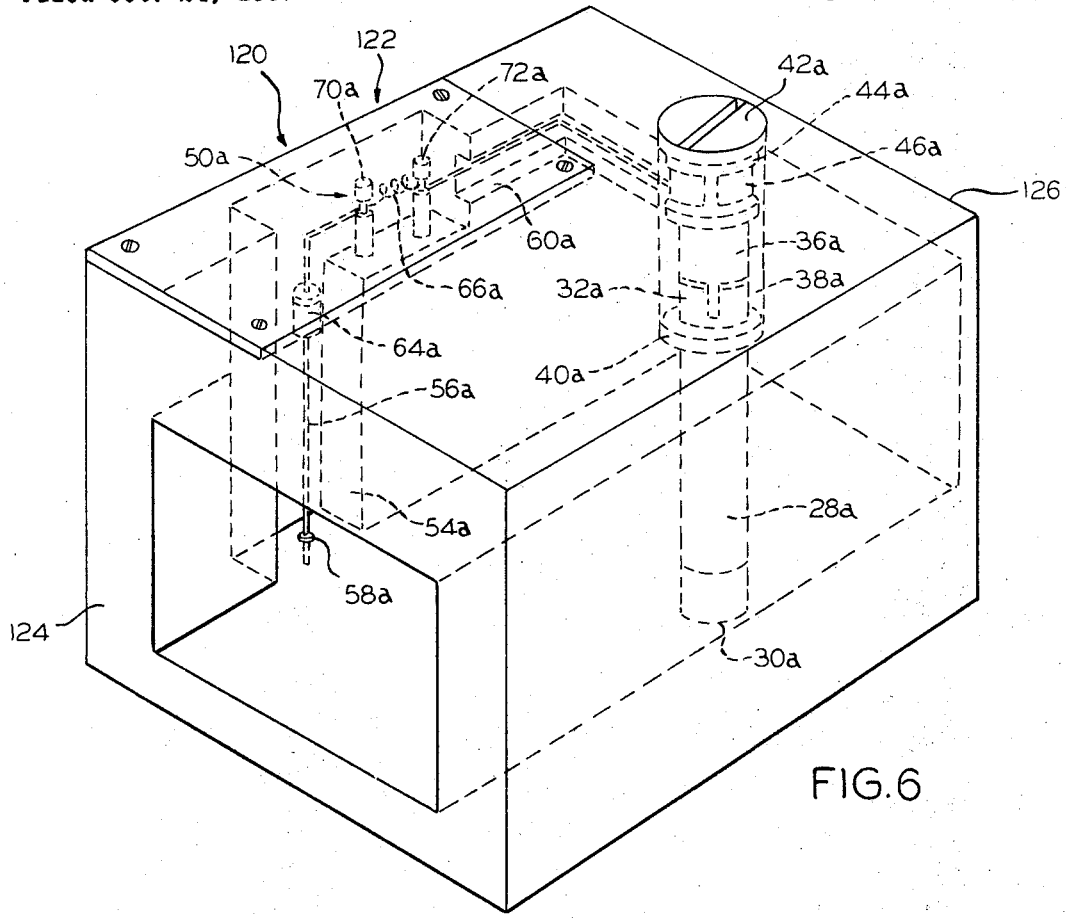
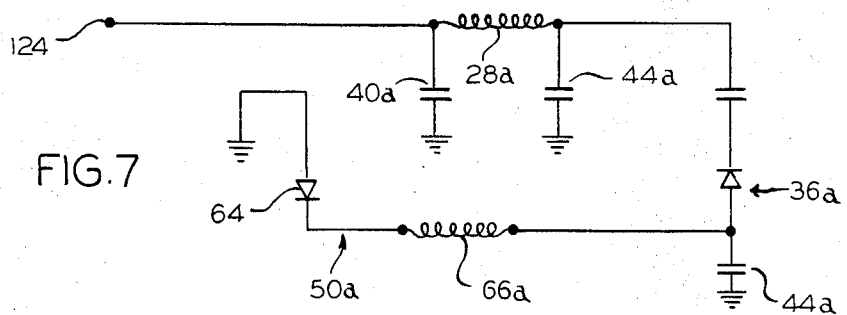
FIG.6
FIG.7
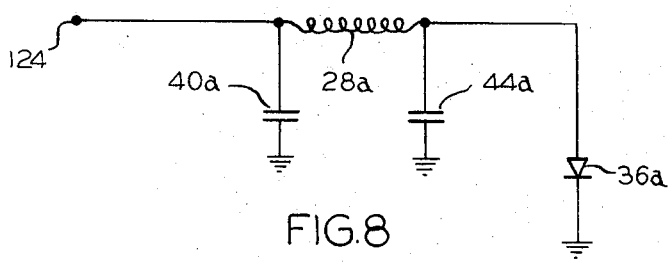
FIG.8
INVENTOR
DAVID C. BRODERICK

United States Patent Office 3,521,197
Patented July 21, 1970

3,521,197
HIGH FREQUENCY POWER LIMITER DEVICE FOR A WAVEGUIDE
David C. Broderick, Beverly, Mass., assignor to Metcom, Inc., Salem, Mass., a corporation of Delaware
Continuation-in-part of application Ser. No. 547,056, May 2, 1966. This application Oct. 24, 1967, Ser. No. 681,056
Int. Cl. H01p 1/14; H01j 7/46
U.S. Cl. 333—13      8 Claims

ABSTRACT OF THE DISCLOSURE

A power limiter device having solid state means for limiting and attenuating the propagation of destructively high powered signals within a broad band of electrical signals.

BACKGROUND OF INVENTION

This application is a continuation-in-part of a copending application filed May 2, 1966, titled "Gaseous-Solid State Power Limiter," David C. Broderick, inventor, Ser. No. 547,056 and a continuation-in-part of a copending application filed Feb. 4, 1966, titled "Gaseous-Solid State Power Limiter," David C. Broderick, inventor, Ser. No. 527,396. These copending applications are continuations-in-part of the patent application filed Aug. 3, 1962, now Pat. No. 3,249,899, titled "Gaseous-Solid State Power Limiter," David C. Broderick, inventor, Ser. No. 214,546.

The present invention relates to devices for limiting passage of peak loads of electromagnetic energy; and more particularly relates to devices for limiting the propagation of destructively high power electrical signals through uniconductor hollow waveguides.

Radar, microwave systems and other high frequency systems require that sensitive receivers and crystal detectors be protected from direct incidence of high powered radio frequency energy pulses. For instance, in radar equipment exposure of sensitive parts of the system to destructively high powered microwave pulse signals arises when a pulse generator, most frequently a magnetron, fires, or when directly beamed signals from a second microwave system fall on the antenna and are transmitted back to the receiver or other sensitive parts of the system. When protection from excessively high power pulse signals is being designed, for example, for use in a radar system, it is known that frequency signals will be emitted by the magnetron or signal generator incorporated within the system. However, it is not predictable what frequency range of signals arising from other radar sets may be beamed directly onto the antenna of the system. It is, therefore, important that the easily damaged elements of a radar system be protected against stray high powered radiation throughout wide range of frequency bands. Gaseous electron discharge tubes which have a resonant discharge gap mounted within a cavity have long been utilized as TR or transmit-receive tubes and ATR or anti-transmit-receive tubes in radar systems. In typical installations, the TR tube is mounted so that upon incidence of a high power pulse signal, the tube fires; that is, the gas within the tube cavity ionizes and electrons are discharged. As a result of the electron discharge a highly conductive electron stream or arc shorts the waveguide, which in the conventional installation designs isolates the receiver from the incident high powered signal.

One disadvantage of the conventional TR tube mounted in a mono-plexor or du-plexor system is that the gas tube is a protective device when the tube fires, but offers substantially no protection prior to the instant of the electron discharge. The gaseous TR tube acts as an on-off switch but not a power limiter.

Another disadvantage of the conventional gaseous TR tube is the fact that in the brief interval of time between the incidence of the signal and the actual shorting of the TR tube by means of the electron discharge, a substantial power "spike" passes the tube and travels into the sensitive receiver.

TR tubes, as normally mounted, will fire only upon the incidence of sufficiently high intensity RF waves which fall within a limited frequency band. High intensity and destructive RF waves of a frequency different than the system frequency band, beamed directly into an antenna will not always dependably fire TR tubes mounted within the receiving section of a radar set.

A continuing trend of utilizing more powerful signal generators and even more sensitive receivers has heightened the need for improved, more reliable, broader frequency band protection of receivers and particularly receiver crystals in radar systems. Accordingly, a true power limiter is required to assure maximum protection of easily damaged receiver components from destructively high powered signals within a broad frequency band of RF waves.

The ideal microwave receiver protective device affords substantial attenuation of high powered signals throughout a wide range of frequencies, a low insertion loss for low powered signals, rapid recovery time to accommodate high pulse repetition rates and to permit passage of signals from close in targets, and dependable long life operation. Some solid state semiconductor devices exhibit in a general way the highly nonlinear power attenuation characteristics that are required to pass power signals with minimal insertion loss and attenuate high power signals with high efficiency.

SUMMARY OF THE INVENTION

The present invention overcomes the problems in the prior power limiter devices by providing a filter means for a rectangular waveguide comprising a nonlinear solid state means for limiting and attenuating destructively high powered signals within a broad band of electrical signals. When a signal having a predetermined power level is radiated toward the receiver, the solid state means conducts causing a short circuit for the electrical energy across the waveguide. Moreover, the conduction of the solid state means detunes the filter means to substantially attenuate the signals which pass through the filter toward the receiver. The detuning of the filter also functions to reflect the incident high powered signals back toward the signal source. To insure an instantaneous response of the limiter to destructively high power signals, a direct current or DC bias, controlled by the radio frequency energy inside the waveguide, switches the solid state means into conduction when the energy reaches a predetermined power level.

The invention herein also provides a receiver protective device comprising a combination gaseous tube and solid state means which is particularly suitable for limiting high frequency power signals. The advantage of using this combination limiter at high frequencies arises from the fact that the present solid state devices are limited by their maximum power capability. High frequency performance in solid state devices, that is, in the megacycle and kilomegacycle range, requires that the distances between the electrodes and boundaries of the component parts of the device be sufficiently short so that junction reactance, spreading resistance and transit times of electrons or holes through the semiconductor will be consistent with high frequency requirements of the device. In general, then, the smaller the solid state or semiconductor structures the higher the frequency response before cut off, but the semiconductor device has less capacity to dissipate heat and thus is usually not suitable for high power application. Thus, in the combination embodiment, the solid state means is specifically utilized to limit and attenuate the power signals prior to the firing of the gaseous tube across its resonant discharge gap.

Accordingly, a primary object of my invention is to provide a novel power limiter of electrical signals for use in rectangular waveguides.

Another object is to provide a radio frequency band power limiter with an improved broadened frequency band response.

Another object is to provide a power limiter having low insertion loss for low powered signals and to efficiently attenuate destructive, high powered signals.

Another object is to provide a power limiter having rapid switching time and rapid recovery time to accommodate high pulse repetition rates.

A related object is to provide a power limiter having rapid recovery time to enable passage of close in target signals into the receiver.

Still another object is to provide solid state means for limiting and attenuating high powered signals which are capable of causing crystal malfunction.

Still another object is to provide a power limiter device comprising a combination gaseous tube and solid state means for limiting and attenuating high powered radio frequency signals ranging from the UHF frequencies and upward.

Another object of my invention is to provide a highly efficient radio frequency power limiter which reduces and substantially eliminates the initial "spike" which passes conventional gaseous electron tubes.

Still another object of my invention is to provide a broad radio frequency band power limiter utilizing lightweight, compact, solid state semiconductor devices, for use in rectangular waveguide structures.

Still another object is to provide a rugged and easily packaged all solid state power limiter means which operates over a greater frequency band and affords substantially faster recovery time than the conventional TR tube.

These and other objects and advantages of the invention will become apparent from the illustrations in the accompanying drawings and the following specification and claims.

BRIEF DESCRIPTION OF THE DRAWINGS

FIG. 1 is a perspective view of a limiter device embodying the principles of the invention and showing in phantom the elements mounted inside the rectangular waveguide;

FIG. 2 is a schematic circuit diagram of the embodiment of my invention shown in FIG. 1;

FIG. 6 is another embodiment of my invention;

FIG. 7 is a schematic circuit diagram of the embodiment shown in FIG. 6;

FIG. 8 is a schematic circuit diagram of FIG. 6 but without a bias means; and

DESCRIPTION OF THE PREFERRED EMBODIMENT

Figure 5:
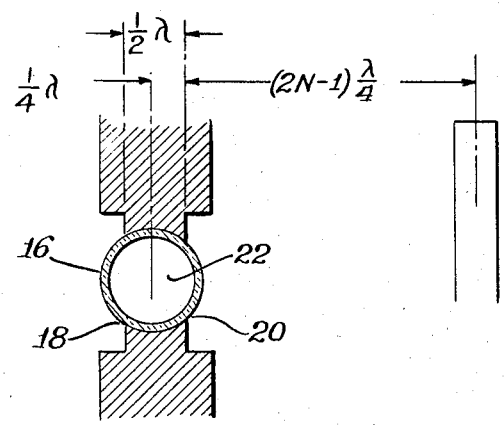
FIG. 5 is a fragmentary sectional view of the embodiment of FIG. 1 taken on the plane of the line 5—5 and viewed in the direction indicated.

Referring now particularly to FIGS. 1, 2 and 5 of the drawings, a first preferred embodiment of my invention is comprised of a waveguide structure in which an input section 10 houses a gaseous electron discharge tube mounted within a resonant cavity and a limiter or output section 12 in which a nonlinear solid state device, described more fully below, is mounted.

A gaseous electron discharge tube 16 comprised of a gas filled quartz cylinder, the exterior of which is ground to a precise diameter, is mounted between two spaced iris apertures 18 and 20. The tube is filled with a small quantity of ionizable gas mixture, specifications of which are known in the art and described in earlier literature. The gas filled tube is positioned at a point of maximum voltage within a standing wave pattern that forms between the iris apertures 18 and 20 which are spaced apart an odd multiple of half electrical wavelengths. The iris apertures are regions of rapid change in impedance and form the boundaries of a cavity 22 in which incident radiation propagates through a standing wave pattern. The schematic illustration in FIG. 2 and in FIG. 5 shows a cavity of $\lambda/2$ electrical wavelengths long in which the gaseous discharge tube 16 is mounted in a midposition.

The limiter section 12 is comprised of a section of waveguide, one end 26 of which is mounted in juxtaposition to the iris 20. At an electrical distance equal to $(2N-1)$ $\lambda/4$ wavelengths from the end 26, a reactance post 28 is mounted centrally in the waveguide as shown in FIG. 1. The lower end 30 of the post 28, as shown in the figures, is grounded by conductive contact with the lower boundary of the waveguide. The upper end 32 of the reactance post 28 is terminated on one terminal of a two-terminal nonlinear semiconductor device 36. A varactor diode, the characteristics of which are described elsewhere in the literature, has functioned very well in embodiments of my invention; however, a variety of suitable solid state diodes is available which will serve the same purpose.

The diode 36 is positioned within a recess 38 in the upper wall of the waveguide. A dielectric spacer 40 holds the end 32 of the reactance post in electrically insulated proper spaced relationship to the sides of the recess. A threaded cap 42, a dielectric spacer 44, and a diode terminal cap 46, assembled as shown in the figures, completes the diode 36 mounting. The dielectric spacers 40 and 44 provide capacitance, and the reactance post itself is inductive. The combination of capacitance and inductance provides a filter section action which is shown schematically in FIG. 2.

It is convenient to dynamically bias the diode 36 to further suppress the energy "spike" which passes the gaseous discharge tube prior to the electron discharge of the tube. The desired bias can be achieved by diverting a small quantity of energy from the waveguide through a bias circuit 50. It is required that the RF and DC grounds be isolated to achieve the desired dynamic bias of the diode. The presence of the dielectric spacer 44 between the cap 42 and the terminal cap 46 of the diode, in addition to contributing capacitance for the filter action, isolates RF ground from the DC ground circuit (FIG. 2).

In the embodiment illustrated in FIG. 1, a slot 54 has been cut into the sidewall of the waveguide a short distance in the direction of the input from the plane of the reactance post 28.

A probe 56 is mounted in the slot 54 and is grounded at its lower extremity 58 of the slot and passed through closed recesses 60 within the waveguide wall to connect with the diode terminal cap 46. A rectifier diode 64 and a small impedance matching inductance 66 are inserted in series in the bias circuit. The bias circuit 50 is supported on insulated posts 70 and 72.

Numerous alternative bias circuit arrangements are practical also. For instance, the device may be a simple voltage probe coupled to the E field in the waveguide through the top or bottom walls of the rectangular waveguide and attached to a rectifier diode and to the switching diode.

Incident high energy radiation arriving at the gaseous electron discharge tube passes into the cavity 22 and a standing wave pattern is generated. After an interval of time the gas within the tube is sufficiently excited to ionize and discharge, thus shoring the input section 10 and closing it to passage of substantial quantities of RF power. Prior to the gaseous electron discharge, a "spike" of energy passes into the limiter section 12 of my device. A portion of that high energy wave was coupled through the probe 56, rectified by diode 64 and utilized to bias the varactor diode 36 into conduction. Arrival of the high energy wave at the inductance post 28 pulses the varactor diode 36 which is RF grounded and, when in a conductive condition, grounds the high energy pulse.

Low energy incident RF signals will readily pass through the tube 16 with little attenuation. The low energy waves propagate through the waveguide without significant coupling to the probe 58 in the bias circuit. Accordingly, the varactor diode is in a highly capacitive nonconductive condition upon the arrival of the low intensity wave at the plane of the reactance post. The waveguide is not shorted through the varactor diode when it is in a capacitive condition and the low intensity RF wave passes through the waveguide without appreciable attenuation.

Figure 3:
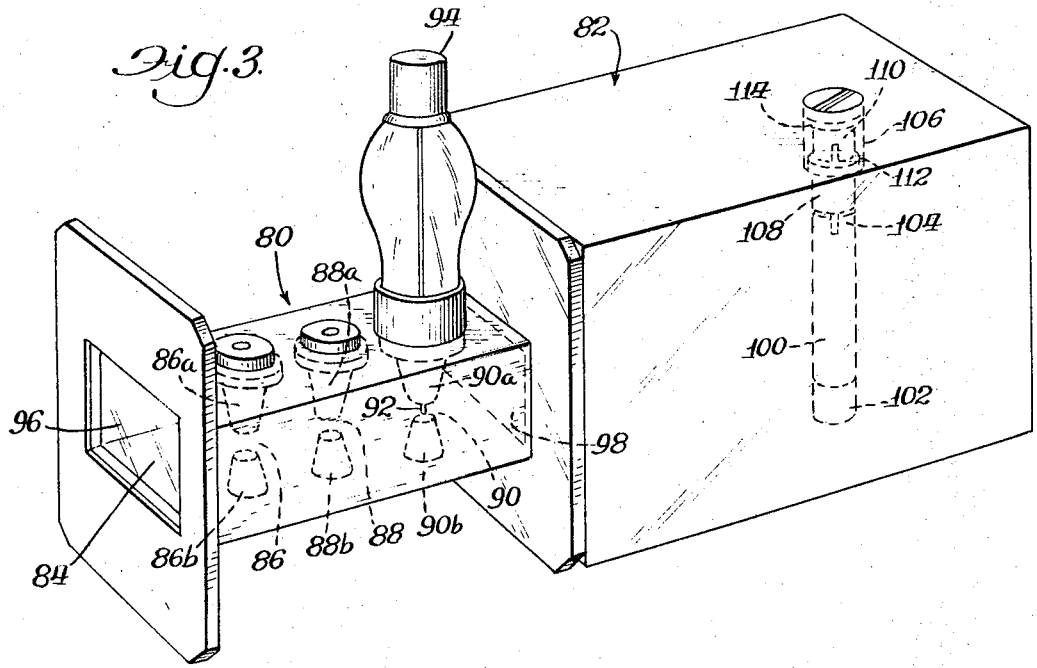
FIG. 3 is a perspective view of another embodiment of my invention.
Figure 4:
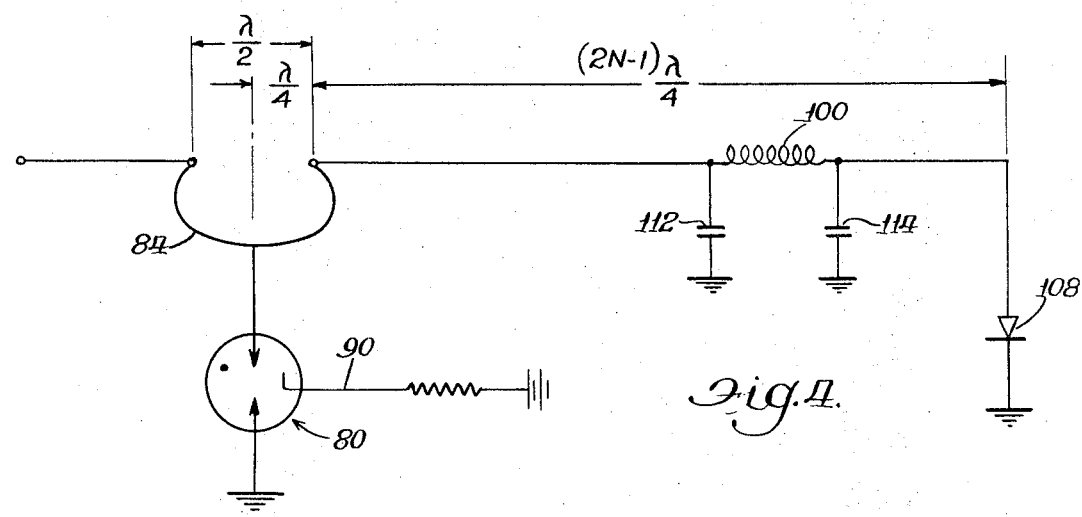
FIG. 4 is a schematic circuit diagram of the embodiment illustrated in FIG. 3.

A second preferred embodiment of my invention is illustrated in FIGS. 3 and 4. A conventional transmit-receive or TR tube 80 is combined with a solid state limiter 82 section which together comprise a simple embodiment of my invention.

The TR tube is comprised of a cavity 84 in which ionization gaps 86, 88 and 90 are formed between truncated conical structures mounted, respectively, in axial alignment 86a, 86b; 88a, 88b; and 90a, 90b. A coaxial keep-alive electrode 92 is positioned in the gap 90. Means for powering the keep-alive electrode, not shown in the illustration, connect through terminal cap 94. Resonant windows 96 and 98, and a small quantity of ionizable gas mixture sealed within the cavity 84, describe the required elements of a TR tube.

The nonlinear solid state limiter 82 is mounted in close juxtaposition to the boundary of the cavity 84 on the output side. A reactance post 100 is centrally positioned within the limiter waveguide a spaced electrical distance from the boundary of cavity 84. The required spacing is readily seen by reference to FIG. 4.

The reactance post 100 is grounded by conductive contact with the waveguide at the lower end 102. A recess 106 is provided for mounting a two-terminal capacitive nonlinear diode 108. The upper terminal 104 of the reactance post is connected to a first terminal of the diode and the second terminal of the diode is grounded through a terminal cap 110. Capacitance is provided in the circuit by dielectric spacers 112 and 114. The dielectric spacer 114 in some configurations can be eliminated. The spacer 112 gives some mechanical support to the reactance post at is upper end.

Different from the embodiment of my invention illustrated in FIGS. 1 and 2, the embodiment of FIGS. 3 and 4 does not provide for a dynamic bias circuit; however, such bias circuits as shown or suggested above in connection with the embodiment of FIG. 1 can be adapted to the device of FIG. 3. Function of the device of FIG. 3 is substantially similar to that described above for the device of FIG. 1.

Turning now to FIGS. 6, 7 and 8, the reference numeral 120 indicates generally another preferred embodiment of a limiter device of my invention. The device 120 comprises a rectangular waveguide section 122 having a front end 124 and a rear end 126. The limiter device 120 is substantially identical to FIG. 1 except for the omission of the gaseous electron tube 16. Similar parts to those shown in FIGS. 1 and 2 are identified in FIGS. 6, 7 and 8 by the same numeral and a suffix "a."

A reactance post 28a is mounted centrally in the waveguide as shown in FIG. 6. The lower end 30a of the post 28a is grounded by conductive contact with the lower boundary of the waveguide section 122. The upper end 32a of the reactance post 28a is terminated on one terminal of a two-terminal nonlinear semiconductor device 36a. The device 36a may be a varactor diode or other suitable semiconductor device.

The diode 36a is positioned within a recess 38a in the upper wall of the waveguide. A dielectric spacer 40a holds the end 32a of the reactance post 28a in electrically insulated proper spaced relationship to the sides of the recess 38a. A threaded cap 42a, a dielectric spacer 44a, and a diode terminal cap 46a, assembled as shown in FIG. 6, completes the mounting for the diode 36a. The dielectric spacers 40a and 44a provide capacitance, and the reactance post itself is inductive at the bandpass frequency of the receiver. The combination of capacitance and inductance provides a filter circuit which is shown schematically in FIG. 7. This filter has substantially no effect upon low powered signals within the bandpass of the receiver.

Preferably, the diode 36a is biased into conduction by a DC signal derived from the electrical energy generated within the waveguide section 122 when the energy reaches a predetermined power level. The effect of the bias is to decrease the switching and recovery time of the diode and also to increase its power capacity. The desired bias can be achieved by diverting a small quantity of energy from the waveguide through a bias circuit 50a which connects with the terminal cap 46a of the diode 36a. The RF and DC grounds should be isolated in order to achieve the desired dynamic bias for the diode 36a. The presence of the dielectric spacer 44a between the cap 42a and the terminal cap 46a of the diode 36a, in addition to contributing capacitance for the filter action, isolates high frequency ground from DC ground (FIG. 7).

A vertical slot 54a is formed in the sidewall of the waveguide section 122 between the front end 124 and the reactance post 28a (FIG. 1). A probe 56a is positioned in the slot 54a and grounded at its lower extremity 58a to the bottom defining wall of the slot 54a.

Recesses 60a are formed within the wall of the waveguide section 124 and communicate with slot 54a. A rectifier diode 64a and a small impedance matching inductance 66a are inserted in series in the bias circuit between extremity 58a and the diode terminal cap 46a. The bias circuit 50a is supported on insulated posts 70a and 72a. Thus, the bias circuit extends through slot 54a, recesses 60a to the diode 36a.

As aforestated, numerous alternative bias circuit arrangements are also within the contemplation of the invention. For instance, the energy coupling probe may be coupled to the E field in the waveguide through the top or bottom walls and in turn attach to a rectifier diode and to the switching diode.

A portion or sample of the electrical energy radiating through the waveguide section 124 is coupled through the probe 56a and rectified by diode 64a. When the energy within the waveguide section 124 reaches a predetermined power level, diode 36a is biased into conduction by the rectified RF voltage. In the conduction state, diode 36a is RF grounded. Thus, the energy reaching the diode 36a is grounded. Moreover, when the diode 36a conducts, the bandpass filter comprising capacitors 40a, 44a, inductor 28a and diode 36a and the capacitance of diode 36a is detuned; thereby presenting a high impedance to the incoming energy.

The low powered energy waves readily propagate through the waveguide section 134 without significant coupling to the probe 56a in the bias circuit. Accordingly, the varactor diode 36a is in a highly capacitive nonconductive condition upon the arrival of the low intensity wave at the transverse plane of the inductive reactance post 28a. The waveguide section 124 is not shorted through the varactor diode when it is in a capacitive condition and the low intensity RF wave passes through the waveguide without appreciable attenuation.

FIG. 8 illustrates a solid state limiter schematic without a bias circuit 50a. Similar parts with respect to FIG. 7 are indicated by the same numeral and "a" suffix designation. Without the bias circuit, diode 36a is switched into conduction solely by the incident energy waves. This arrangement is adequate when power capacity and switching time are not critical.

Figure 9:
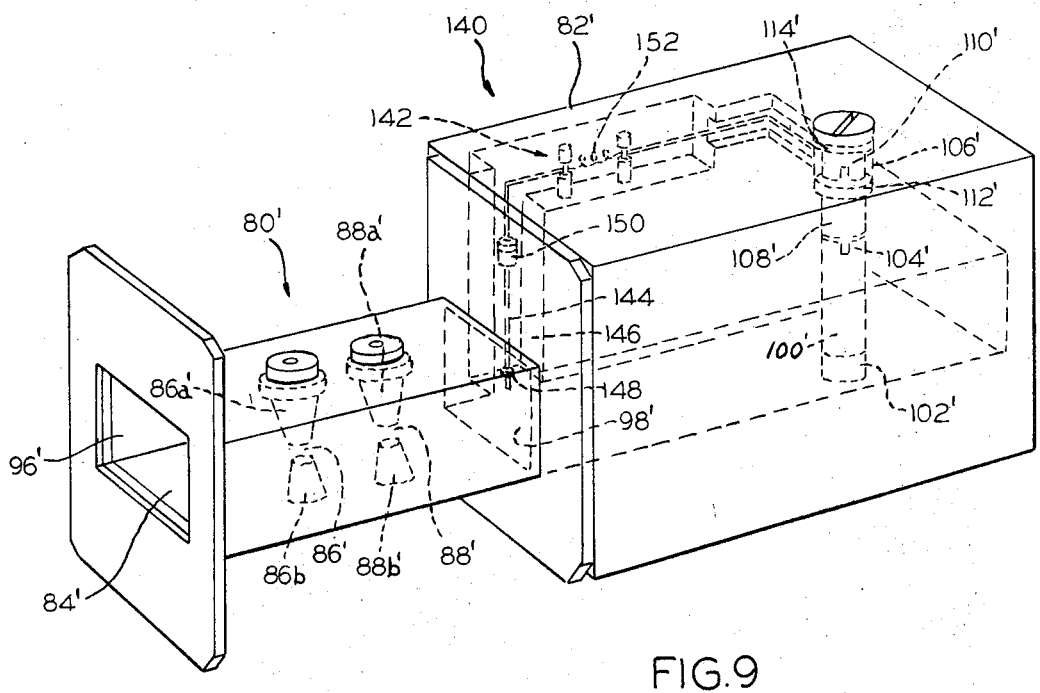
FIG. 9 is a perspective view of another embodiment of my invention.

Referring to FIG. 9, the reference numeral 140 indicates generally another preferred embodiment of a limiter device of my invention. As may be seen, the limiter device 140 is similar to FIG. 3 except for the omission of the keep-alive structure shown in FIG. 3 and the inclusion of a DC bias circuit. Similar parts to those shown in FIG. 3 are identified with the same designation and a prime (').

The limiter device 140 comprises a TR tube section 80' and a solid state limiter section 82'. The TR tube is comprised of a cavity 84' in which discharge or ionization gaps 86' and 88' are formed between truncated conical structures 86a', 86b' and 88a', 88b' respectively. The conical structures lie substantially on the axial plane of the limiter device. Resonate windows 96' and 98', terminate the input and output ends of the cavity 84' of the TR tube section 80'. A small quantity of ionizable gas mixture is sealed within cavity 84'.

The solid state limiter section 82' is mounted in juxtaposition with the output window 98'. A reactance post is centrally positioned within the rectangular waveguide of limiter section 82'. Similar to FIG. 4, post 100' is placed (2N−1) λ/4 from the output of the cavity 84'.

The reactance post 100' is grounded by conductive contact with the waveguide at the lower end 102'. A recess on opening 106' is provided for mounting a two-terminal capacitive nonlinear diode 108'. The upper terminal 104' of the reactance post is connected to a first terminal of the diode and the second terminal of the diode is grounded through a terminal cap 110'. Capacitance is provided by the dielectric spaces 112' and 114'.

A bias circuit 142 similar to the bias circuit shown in FIGS. 1 and 6, biases the diode 108' into conduction when a predetermined power level is reached. A probe 144 is disposed inside a slot 146 and grounded at its lower end 148. A rectifier diode 150 and an inductance 152 are connected in series between the end 148 and the diode 150. The inductance 152 is connected at one end to the cathode side of the rectifier diode 150 and at the opposite end to the terminal cap 110'.

The bias circuit 152 causes rapid switching of the diode 150 into conduction and thereby enables the solid state limiter section 82' to effectively and efficiently short to ground the "spike" energy developed prior to the firing of the TR tube 80'. Thus, a TR tube without the conventional keep-alive structure as shown in FIG. 9 is quite adequate for use in combination with the solid state limiter section 82' of this invention.

The description of the preferred embodiments of this invention is intended merely as illustrative of this invention, the scope and limits of which are set forth in the following claims.

I claim:
1. A device for limiting the power of radio frequency signals comprising in combination;
   a cavity,
   a gaseous electron discharge structure mounted within the cavity,
   a section of a rectangular waveguide having a first end, mounted in juxtaposition to the cavity,
   a reactive post centrally mounted transversely within the waveguide an even multiple of quarter electrical wavelengths distance from the electron discharge device, the reactive post having a first end and a second end, the first end of the post being conductively connected to an inner wall surface of the waveguide,
   a non-linear two-terminal semiconductor diode, said diode being capacitive in its non-conducting state, said diode being capacitive and non-conducting when said radio frequency signals are propagating along the waveguide at a low intensity energy level, said diode being conductive and substantially less capacitive when said radio frequency signals are propagating along the waveguide at a higher intensity energy level in comparison with said low intensity level, and
   electrical band-pass filter means for said radio frequency signals, said filter means comprising said diode, the second end of the post being connected to one terminal of the diode, the second terminal of the diode being grounded.

2. The device of claim 1 wherein the electron discharge device comprises a quartz cylinder containing a mixture of ionizable gas.

3. The device of claim 1 wherein the electron discharge device comprises a TR tube mounted within a section of rectangular waveguide.

4. The device of claim 1 includes bias means mounted within the waveguide, said bias means being associated with said semiconductor diode and switching the semiconductor diode into a conductive condition from a nonconductive condition when the radio frequnecy energy radiating inside the waveguide reaches a predetermined power level.

5. The device of claim 4, wherein said bias means comprises:
   a probe disposed between the first end of the waveguide and the semiconductor diode; and
   a rectifier means interposed between the probe and said diode, said rectifier means rectifying the radio frequency energy from said probe to provide a direct current (DC) voltage for said switching of the diode into conduction.

6. The device of claim 4, wherein:
   said post is inductive for a predetermined band of frequencies and said semiconductor diode is capacitive in said nonconductive state for said band of frequencies; and
   capacitance means isolates said second end of the post from the wall of the waveguide, said post, said capacitance means and the capacity of said diode when in the nonconductive state cooperating to comprise at least some of the elements of said bandpass filter, said bandpass filter being detuned when the semiconductor diode is biased into conduction.

7. The device of claim 5, wherein:
   said rectangular waveguide includes an upper wall and lower wall, said first end of the post being conductively connected to said inner surface of the lower wall;
   a recess is formed in said upper wall, said diode being disposed within said recess; and
   capacitance means electrically isolates and mechanically supports said second end of the post and said one terminal of the diode from the sides of the recess, said rectifier means being a rectifier semiconductor diode, said probe having one extremity connected to ground.

8. A device for limiting the power of radio frequency signals comprising, in combination:
a cavity;
a gaseous electron discharge structure mounted within the cavity;
a section of a rectangular waveguide having a first end, the first end of the waveguide section being mounted in juxtaposition to the cavity, a reactive means disposed in the waveguide an even multiple of quarter wavelengths distance from the electron discharge device;
a nonlinear semiconductor diode;
a filter means comprising at least said reactance means and said diode; and
bias means mounted within the waveguide, said bias means being associated with the diode and switching the diode into a conductive condition when the radio frequency energy radiating inside the waveguide reaches a predetermined power level, said bias means including a probe disposed on a transverse plane between the reactance means and the first end of the waveguide section to sample said energy.

References Cited

UNITED STATES PATENTS

| | | | |
|---|---|---|---|
| 3,249,899 | 5/1966 | Broderick | 315—39 X |
| 2,760,065 | 8/1956 | Wilkes | 329—161 |
| 2,810,830 | 10/1957 | Glass et al. | 333—13 X |
| 3,164,792 | 1/1965 | Georgiev et al. | |
| 3,174,119 | 3/1965 | Jones et al. | 333—13 X |
| 3,226,661 | 12/1965 | Garver et al. | 329—161 X |
| 3,364,445 | 2/1966 | Broderick | 315—39 |

HERMAN K. SAALBACH, Primary Examiner

S. CHATMON, Jr., Assistant Examiner

U.S. Cl. X.R.

315—39